(12) United States Patent (10) Patent No.: US 12,623,640 B2
Escher et al. (45) Date of Patent: May 12, 2026

(54) ACTUATION DEVICE FOR A MOTOR VEHICLE, MOTOR VEHICLE

(71) Applicant: Robert Bosch GmbH, Stuttgart (DE)

(72) Inventors: Guenter Escher, Oberstdorf (DE); Bernd Lutz, Kempten (DE); Eduard Maiterth, Heilbronn (DE); Juergen Kissner, Oppenweiler (DE); Manfred Fischer, Oppenweiler (DE); Martin Baeuml, Weitnau (DE); Martin Winkler, Sonthofen (DE); Stephan Knackert, Haldenwang (DE); Timo Knecht, Mundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/509,498

(22) Filed: Nov. 15, 2023

(65) Prior Publication Data

US 2024/0166173 A1 May 23, 2024

(30) Foreign Application Priority Data

Nov. 22, 2022 (DE) ..................... 10 2022 212 427.8

(51) Int. Cl.
B60T 7/04 (2006.01)
B60K 26/02 (2006.01)
B60Q 3/20 (2017.01)

(52) U.S. Cl.
CPC .............. B60T 7/042 (2013.01); B60K 26/02 (2013.01); B60Q 3/20 (2017.02)

(58) Field of Classification Search
None
See application file for complete search history.

(56) References Cited

U.S. PATENT DOCUMENTS

| | | | |
|---|---|---|---|
| 5,863,112 A | 1/1999 | Didato | |
| 2004/0147317 A1* | 7/2004 | Ito | A63F 13/45 463/36 |
| 2016/0334829 A1* | 11/2016 | Kaijala | G05G 1/38 |
| 2022/0144222 A1 | 5/2022 | Kim et al. | |

FOREIGN PATENT DOCUMENTS

| | | | | |
|---|---|---|---|---|
| DE | 102 39 913 A1 | 3/2004 | | |
| DE | 103 12 547 A1 | 10/2004 | | |
| DE | 10 2013 106 654 A1 | 1/2015 | | |
| DE | 10 2017 119 392 A1 | 3/2018 | | |
| DE | 10 2017 123 030 A1 | 4/2018 | | |
| DE | 10 2019 118 918 A1 | 1/2021 | | |
| EP | 2093111 A1* | 8/2009 | | B60T 11/21 |
| KR | 2054470 B1* | 12/2019 | | B60K 26/02 |

* cited by examiner

*Primary Examiner* — Vicky A Johnson

(74) *Attorney, Agent, or Firm* — Maginot, Moore & Beck LLP

(57) ABSTRACT

An actuation device for a motor vehicle, in particular for specifying a braking and/or acceleration request, with a first and a second housing portion is disclosed. The first housing portion includes an actuating surface on a top surface facing away from the second housing portion, or a cover with the actuating surface is arranged on the top surface. The housing portions are connected to each other by a hinge. An axis of rotation of the hinge is arranged laterally spaced apart from the actuating surface.

18 Claims, 2 Drawing Sheets

(A-A)

ACTUATION DEVICE FOR A MOTOR VEHICLE, MOTOR VEHICLE

This application claims priority under 35 U.S.C. § 119 to patent application no. DE 10 2022 212 427.8, filed on Nov. 22, 2022 in Germany, the disclosure of which is incorporated herein by reference in its entirety.

The disclosure relates to an actuation device for a motor vehicle, in particular to specify a braking and/or acceleration request.

In addition, the disclosure relates to a motor vehicle having at least one such actuation device.

BACKGROUND

From the prior art, it is known to detect an actuation of an actuation device for a motor vehicle which can be actuated by a driver using a sensor assigned to the actuation device. If the driver actuates the actuation device, a braking or acceleration request of the driver is in particular detected as a function thereof. For example, brake systems with electromechanical brake amplifiers are known that, together with a vehicle assistance system, in particular an electronic stability program (ESP), form a redundant brake-by-wire system, in which there is no mechanical connection from the actuation device to the brake system. A braking request is forwarded, for example, as a function of an actuation of the actuation device to an electromechanical actuator which is designed to carry out a pressure build-up in the braking system. Analogously, actuation devices for drive units, in particular with internal combustion engines and/or electric motors, are known from motor vehicles which are part of a drive-by-wire system without a mechanical connection to the drive unit. For example, an acceleration request is detected as a function of an actuation of the actuation device and forwarded to the drive unit. Due to the lack of mechanical coupling of the actuation devices to the brake system and/or the drive unit, it is possible to design such actuation devices which are stroke-free or with at least a low stroke of a few millimeters. The use of different measurement methods is known for detecting the actuation. For example, the disclosure documents DE 10 2017 119 392 A1, DE 102 39 913 A1, and DE 103 12 547 A1 each disclose stroke-free pedals as well as the detection of an actuation of a stroke-free pedal by means of strain gages.

SUMMARY

The actuation device according to the disclosure is characterized in that it comprises a first and a second housing portion, the first housing portion comprises an actuating surface on a top side facing away from the second housing portion, or that a cover with the actuating surface is arranged on the top side, the housing portions are connected to each other by a hinge, and in that an axis of rotation of the hinge is arranged laterally spaced apart from the actuating surface. The hinge arranged laterally spaced apart from the actuating surface ensures a particularly advantageous mounting of a low-stroke actuation device as described above. The axis of rotation is not mounted below the actuating surface, but rather is outside the actuating surface. This ensures that the actuation device can be actuated via the actuating surface whenever it is actuated. There is a sufficiently large lever arm between the actuating surface and the axis of rotation that always allows actuation regardless of where a force is applied to the actuating surface. The actuation device according to the disclosure thus provides an advantageous alternative to actuation devices with traditional kinematics, in particular pedal assemblies with a long swing arm and fixation to a motor vehicle's firewall, as well as pedals with a tilt axis lying below a tread surface. In contrast, a novel arrangement of the axis of rotation with a short swing arm is provided in the actuation device according to the disclosure, which is advantageously ensured by the correspondingly arranged axis of rotation of the hinge. The mounting point is therefore not arranged on a body of the motor vehicle, in particular on the firewall, but is part of the actuation device or the housing portions themselves. The elimination of the long swing arm advantageously reduces the cost of assembly and generates additional space that is useful for other components. In addition, the elimination of the long pedal lever significantly reduces the mass of the entire actuator. The hinge with the axis of rotation connects the first housing portion as a housing upper portion to the actuating surface and the second housing portion as a housing lower portion. The second housing portion is in particular configured to be mounted in a ground region of the motor vehicle in front of a driver's seat. When installed in the motor vehicle as intended, the hinge is located in the longitudinal direction, in particular spaced apart from the actuating surface, as well as below a plane of the actuating surface, in particular at the height of the second housing portion. Preferably, at least one spring element, in particular configured as a coil spring, is arranged between the housing portions as a return spring. Particularly preferably, a plurality of such spring elements are arranged between the housing portions. In particular, it is provided that the end of the actuating surface facing away from the hinge has a stroke of less than 10 mm, in particular less than 5 mm.

According to a preferred further development of the disclosure, it is provided that at least one of the housing portions is configured at least approximately in a mirror-symmetrical manner in transverse extension and/or longitudinal extension. The actuation device thus has a particularly advantageously simple geometry.

Particularly preferably, it is provided that the axis of rotation is arranged in a plane below the actuating surface. The arrangement of the axis of rotation in the plane below the actuating surface provides the advantage that the hinge with the axis of rotation is outside a range in which a user's foot is located when actuating the actuation device and the hinge does not impede this.

According to a preferred further development of the disclosure, it is provided that the axis of rotation runs at least approximately parallel to an edge of the actuating surface and/or at least one of the housing portions and/or is aligned transversely to a longitudinal extension of the actuating surface and/or at least one of the housing portions. Such an arrangement or orientation of the axis of rotation advantageously ensures that the actuation device can be particularly intuitively actuated. Preferably, when used as intended, the axis of rotation is arranged transverse to a longitudinal direction of the actuating surface.

Particularly preferably, it is provided that a distance of the axis of rotation to the edge is less than the longitudinal extension of the actuating surface and/or at least one of the housing portions, in particular less than half of the longitudinal extension. A particularly compact design of the actuation device is advantageously ensured by a distance defined in this way. Preferably, the distance is less than a third, in particular less than a quarter of the longitudinal extension.

According to a preferred further development of the disclosure, it is provided that the hinge with the axis of rotation is arranged on the actuation device such that, when used as intended, the axis of rotation is arranged in the longitudinal direction of the actuating surface in front of the actuating surface. Such an arrangement of the axis of rotation in the longitudinal direction in front of the actuating surface advantageously ensures that the axis of rotation reliably allows actuation of the actuation device and does not impede this.

Particularly preferably, it is provided alternatively that the hinge with the axis of rotation is arranged on the actuation device such that, when used as intended, the axis of rotation is arranged in the longitudinal direction of the actuating surface behind the actuating surface. Such an arrangement of the axis of rotation in the longitudinal direction behind the actuating surface advantageously ensures that the axis of rotation reliably allows actuation of the actuation device and does not impede this.

According to a preferred further development of the disclosure, it is provided that the hinge comprises a first and a second hinge element, and that the hinge elements are pivotally mounted to each other around the axis of rotation. Such a configuration of the hinge creates a particularly advantageously simple geometry.

Particularly preferably, at least one of the hinge elements is formed integrally with one of the housing portions, in particular the first hinge element is formed integrally with the first housing portion and/or the second hinge element is formed integrally with the second housing portion. The one-piece design of the respective hinge element with the housing portion results in the advantage that they are manufactured together without an additional step when assembling the actuation device.

According to a preferred further development of the disclosure, it is provided that at least one of the hinge elements is connected to one of the housing portions in a form-fit, force-fit, and/or material-fit manner, in particular the first hinge element is connected to the first housing portion and/or the second hinge element is connected to the second housing portion. The form-fit, force-fit, and/or material-fit connection provides a particularly advantageous option for the flexible production of the hinge element and the housing portion, in particular its geometry.

Particularly preferably, it is provided that at least one electrical component of a sensor arrangement for detecting an actuation force exerted on the actuating surface is arranged in a bottom region of the second housing portion. Such a sensor arrangement provides a particularly advantageous option for detecting an acceleration and/or braking request.

According to a preferred further development of the disclosure, it is provided that an illumination device, in particular a light-emitting diode, is arranged in a bottom region of the second housing portion. The illumination device provides a particularly advantageous option for providing visual feedback to a user about an actuation of the actuation device. Preferably, the illumination device is configured to be controlled together with ambient lighting of the motor vehicle. For example, the illumination device is turned on when the driver enters and/or exits the vehicle and/or turned off when driving. Alternatively, a lighting intensity or color of the illumination device is defined as a function of an actuation force applied to the actuation surface. In particular, brake and acceleration requests are assigned to different light colors.

It is particularly preferred that the component and the illumination device are arranged on a common printed circuit board. The arrangement on a common printed circuit board results in the advantage that electrical contacting is ensured without additional electrical lines. The printed circuit board with the component and the illumination device is advantageously insertable into the second housing portion as a pre-assembled unit.

According to a preferred further development of the disclosure, it is provided that a light-guiding element for the illumination device is arranged in the housing portions, which extends from the illumination device to an opening in the actuating surface. The light-guiding element advantageously ensures that a beam of light emanating from the illumination device can be reliably detected on the actuating surface.

The motor vehicle according to the disclosure is characterized by at least one actuation device set forth below. This also results in the advantages already mentioned.

BRIEF DESCRIPTION OF THE DRAWINGS

Further preferred features and combinations of features result from the above-described and from the claims. The disclosure is explained in more detail below with reference to the drawings. The figures show:

DETAILED DESCRIPTION

Figure 1:
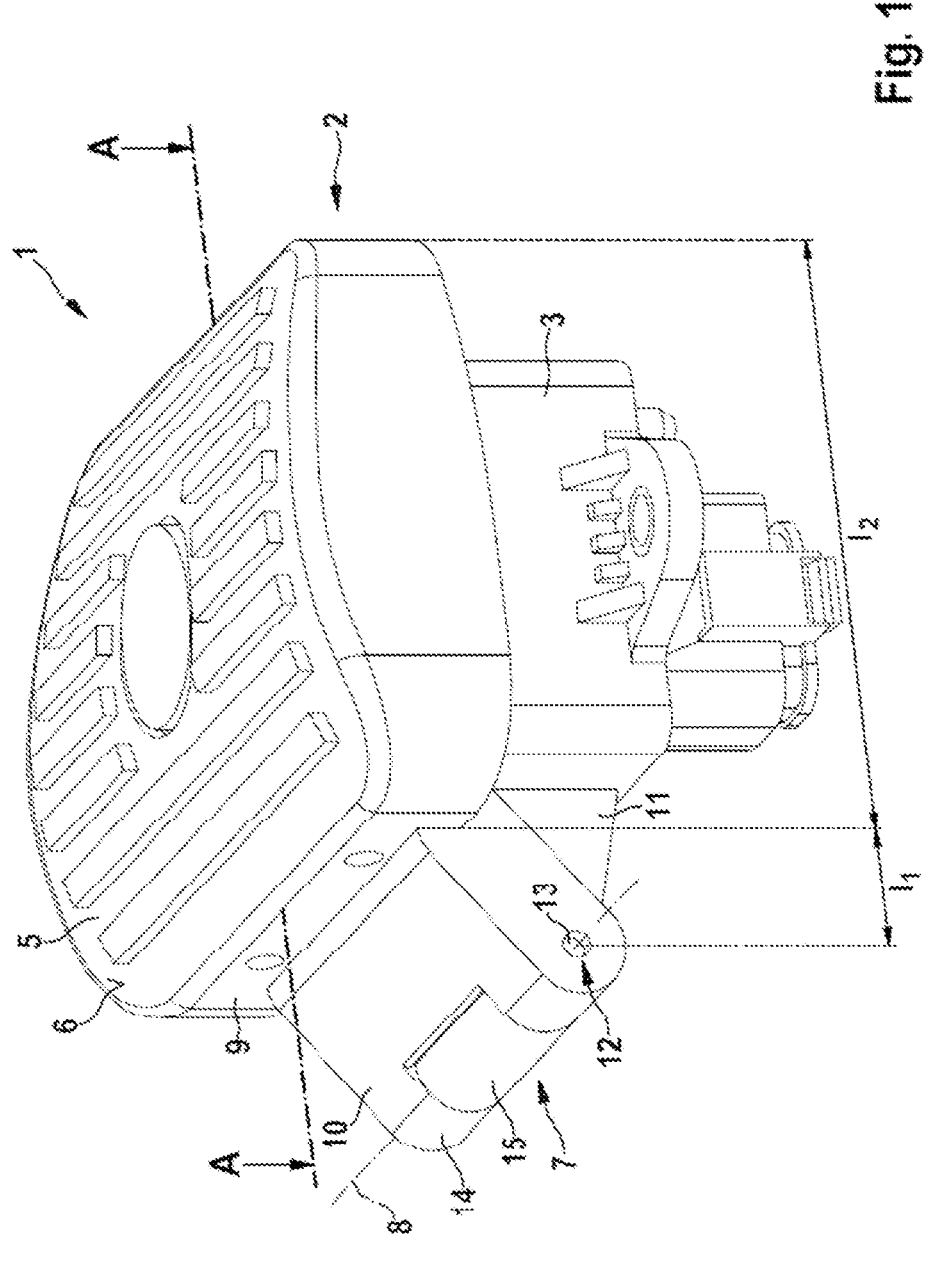
FIG. 1 an advantageous actuation device, and
FIG. 2 a sectional view of the actuation device.

FIG. 1 shows an exemplary embodiment of an actuation device 1 for a motor vehicle not shown. The actuation device 1 is in particular configured to specify a braking and/or an acceleration request, and can in particular be arranged or is arranged in the footwell of the motor vehicle.

The actuation device 1 comprises a first housing portion 2 and a second housing portion 3. In the present case, the first housing portion 2 comprises a cover 5 with an actuating surface 6 on a top side 4 facing away from the second housing portion 3. Alternatively, the first housing portion 2 has the actuating surface 6 directly on the upper side 4, in particular it is formed integrally therewith. In the present case, both the two housing portions 2, 3 and the cover 5 are at least approximately mirror-symmetrically configured in the transverse extension. The mirror plane corresponds to the drawn sectional plane A-A.

The two housing portions 2, 3 are connected to each other by a hinge 7. An axis of rotation 8 of the hinge 7 is arranged laterally and spaced apart from the actuating surface 6. The axis of rotation 8 is arranged in a plane below the actuating surface 6, i.e., below the actuating surface 6 when used or when installed as intended in a motor vehicle.

In addition, the axis of rotation 8 is respectively parallel to an edge 9 of the actuating surface 6 as well as to corresponding outer edges of the housing portions 2, 3. In other words, the axis of rotation 8 is thus aligned transversely to the longitudinal extension of the actuating surface 8 as well as the housing portions 2, 3.

A distance $1_1$ is less than half, in the present case less than a third or a quarter of the longitudinal extension $1_2$ of the actuating surface 6 and thus also of the housing portions 2, 3. The actuation device 1 thus has a particularly compact design, because the axis of rotation 8 is arranged close to the housing portions 2, 3.

In the present case, the hinge 7 with the axis of rotation 8 is arranged on the actuation device 1 such that the axis of rotation 8 is arranged in front of or behind the actuating surface 6 in the longitudinal direction of the actuating surface 6 when used or installed in a motor vehicle as intended, depending on the selected orientation in the motor vehicle. The actuation device 1 can be flexibly installed and inserted in both orientations by this arrangement.

The hinge 7 comprises a first hinge element 10 and a second hinge element 11. The two hinge elements 10, 11 are pivotally mounted to each other around the axis of rotation 8. In the present case, bores 12 in which a pin 13 is arranged are configured in the two hinge elements 10, 11.

In the present case, the first hinge element 10 comprises two geometrically identical end sections 14, which are spaced apart from one another in the transverse extension of the hinge element 10, and in a section parallel to the sectional plane A-A, have a semi-circular shape arranged on a rectangle.

The respective bore is arranged in a circle center of the semicircle. A geometrically corresponding end section 15 of the second hinge element 11 is inserted between the two end sections 14.

In the present case, each of the two hinge elements 10, 11 is formed integrally with one of the housing portions 2, 3, i.e., the first hinge element 10 is formed integrally with the first housing portion 2 and the second hinge element 11 is formed integrally with the second housing portion 3.

Figure 2:
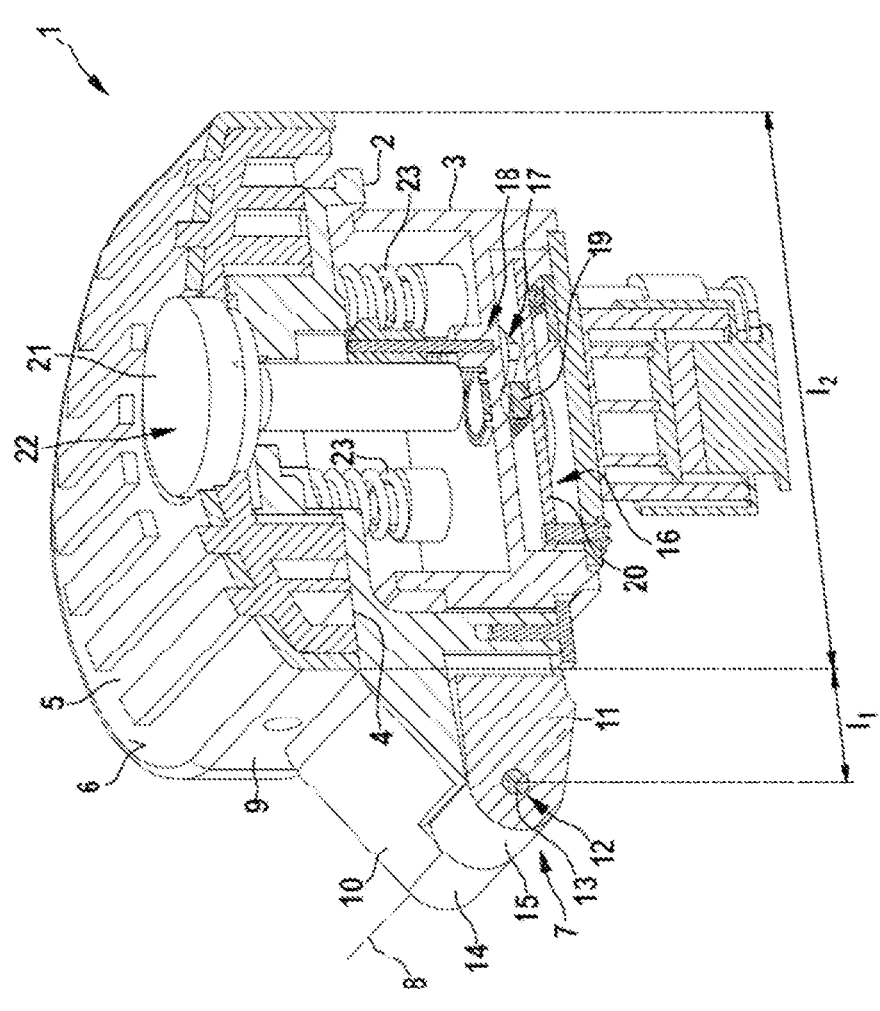

In FIG. 2, which depicts a sectional view of the actuation device 1 shown in FIG. 1 by a sectional plane A-A indicated in FIG. 1, the inner workings of the actuation device 1 can be seen.

At least one electrical component 17 of a sensor arrangement 18 for detecting an actuation force exerted on the actuating surface is arranged in a bottom region 16 of the second housing portion 3. Furthermore, an illumination device 19, in the present case as a light-emitting diode, is arranged in the bottom region 16. The component 17 and the illumination device 19 are arranged on a common printed circuit board 20, and thus particularly advantageously simply electrically contacted.

Furthermore, a light-guiding element 21 for the illumination device 19 is arranged in the housing portions 2, 3, which extends from the illumination device 19 through the housing portions 2, 3 to an opening 22 in the actuating surface 6. The illumination device 19 is designed as a light-emitting diode, in particular monochrome, or has an RGB control.

In addition, at least one spring element 23, in the present case configured as a coil spring, is arranged as a return spring between the housing portions 2, 3. In the present case, a plurality of such spring elements 23 is arranged between the housing portions 2, 3.

What is claimed is:

1. An actuation device for a motor vehicle for specifying a braking and/or acceleration request, comprising: a housing having
   a first housing portion; and
   a second housing portion,
   wherein the first housing portion includes an actuating surface on a top surface facing away from the second housing portion, or a cover with the actuating surface arranged on the top surface,
   wherein the first housing portion and the second housing portion are connected to each other by a hinge, and
   wherein an axis of rotation of the hinge is arranged laterally spaced apart from the actuating surface.

2. The actuation device according to claim 1, wherein at least one of the first housing portion and the second housing portion is configured at least approximately mirror-symmetrically in transverse extension and/or longitudinal extension.

3. The actuation device according to claim 1, wherein the axis of rotation is arranged in a plane below the actuating surface.

4. The actuation device according to claim 1, wherein the axis of rotation runs at least approximately parallel to an edge of the actuating surface and/or at least one of the first housing portion and the second housing portion and/or is aligned transversely to a longitudinal extension of the actuating surface and/or at least one of the first housing portion and the second housing portion.

5. The actuation device according to claim 4, wherein a distance of the axis of rotation to the edge is less than half of the longitudinal extension of the actuating surface and/or at least one of the first housing portion and the second housing portion.

6. The actuation device according to claim 4, wherein a distance of the axis of rotation to the edge is less than the longitudinal extension of the actuating surface and/or at least one of the first housing portion and the second housing portion.

7. The actuation device according to claim 1, wherein the hinge with the axis of rotation is arranged on the actuation device such that the axis of rotation, when used as intended, is arranged in the longitudinal direction of the actuating surface behind the actuating surface.

8. The actuation device according to claim 1, wherein:
   the hinge includes a first and a second hinge element, and
   the hinge elements are pivotally mounted to each other around the axis of rotation.

9. The actuation device according to claim 8, wherein:
   the first hinge element is formed integrally with the first housing portion, and/or
   the second hinge element is formed integrally with the second housing portion.

10. The actuation device according to claim 8, wherein:
   the first hinge element is connected to the first housing portion, and/or
   the second hinge element is connected to the second housing portion.

11. The actuation device according to claim 8, wherein at least one of the hinge elements is formed integrally with one of the first housing portion and the second housing portion.

12. The actuation device according to claim 8, wherein at least one of the hinge elements is connected to one of the first housing portion and the second housing portion.

13. The actuation device according to claim 1, further comprising at least one electrical component of a sensor arrangement for detecting an actuating force exerted on the actuating surface arranged in a bottom region of the second housing portion.

14. The actuation device according to claim 13, further comprising at least one illumination device arranged in a bottom region of the second housing portion, wherein the at least one electrical component of the sensor arrangement and the illumination device are arranged on a common printed circuit board.

15. The actuation device according to claim 1, further comprising at least one illumination device arranged in a bottom region of the second housing portion.

16. The actuation device according to claim 15, further comprising a light-guiding element for the illumination device, wherein:
   the light-guiding element is arranged in the first housing portion or the second housing portion, and
   the light-guiding element extends from the illumination device to an opening in the actuating surface.

17. The actuation device according to claim 15, wherein the at least one illumination device includes a light-emitting diode.

18. A motor vehicle comprising at least one actuation device according to claim 1.

\* \* \* \* \*